Patented Sept. 2, 1947

2,426,586

UNITED STATES PATENT OFFICE 2,426,586

ORGANOMETALLIC SALTS AND PROCESS FOR MAKING THE SAME

Adolph J. Beber, Copley, Ohio, assignor to The B. F. Goodrich Company, New York, N. Y., a corporation of New York No Drawing. Application March 2, 1945, Serial No. 580,725

17 Claims. (Cl. 260—299)

This invention relates to new compositions of matter and pertains specifically to mixed organometallic salts and a method of preparing the same.

According to my invention these mixed organometallic salts can be prepared by reacting in an acidified aqueous medium a water-soluble salt of a metal having a valence greater than one with the alkali metal salt of N-methylene dithiocarbamic acid and with the alkali metal salt of a sulfhydryl compound; whereby the mixed organometallic salt is precipitated from the reaction medium.

There are a great number of salts which fall within the scope of my invention, and, in general, they may be represented by the following formula: A—M—B, where the metal, M, is joined to A, the acid radical of N-methylene dithiocarbamic acid, and to B, a sulfide radical derived by replacement of the acidic hydrogen atom of a sulfhydryl compound.

The A component in a preferred modification of the invention is formed by reacting formaldehyde with ammonium dithiocarbamate to form the ammonium salt of N-methylene dithiocarbamic acid which is then converted to the alkali metal salt to be utilized in the formation of the complex metal salt. The following equation describes the reaction as it is believed to take place:

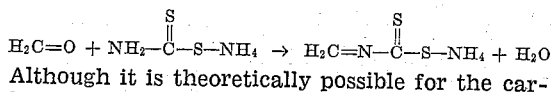

Although it is theoretically possible for the carbonyl group of the aldehyde to react with the ammonium radical of ammonium dithiocarbamate, the reaction actually proceeds in the other direction as indicated in the above equation. This is substantiated by the release of ammonia when the sodium salt of this reaction product is formed which is in agreement with the following equation:

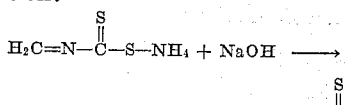

The sodium or potassium salt of N-methylene dithiocarbamic acid can also be formed by adding the formaldehyde to a solution of the sodium or potassium salt of dithiocarbamic acid.

The B component in the formation of these mixed organometallic salts is the alkali metal salt of a sulfhydryl compound. Suitable compounds include thio-acids such as dithionic, dithiocarbamic, and xanthogenic acids; and simple aliphatic and aromatic mercaptans; as well as the mercaptans of the nitrogen containing members of the heterocyclic series where the nitrogen is connected by a double bond to the carbon to which the mercapto group is joined and the remaining valence bond of this carbon is joined to sulfur, carbon, or oxygen atoms in the ring, as in such compounds as the mercapto-thiazoles, -oxazoles, -thiazines, -oxazolines, -thiazolines, -quinolines, and -thiodiazoles.

The metal M in the mixed organometallic salts of this invention may be any metal which forms water-soluble salts and has a valence greater than one, including magnesium, calcium, barium, zinc, lead, copper, iron, nickel, manganese, and the like. In the formation of these mixed organometallic salts of this invention it is preferred to form the A reagent by reacting equimolecular portions of formaldehyde and ammonium dithiocarbamate in an aqueous solution with stirring. The precipitate that forms is then dissolved by forming the sodium or potassium salt of the reaction product with the liberation of ammonia from the reaction mixture. The sodium or potassium salt of the sulfhydryl compound (the B reagent) is then made in the usual manner, as by dissolving the free sulfhydryl compound in an alkali solution or in some cases by direct synthesis of the sodium or potassium salts. These two alkali metal salt solutions are then combined, and to this resulting solution, a slightly acidified aqueous solution of a water-soluble salt of the metal M is added slowly together with a sufficient amount of dilute acid to cause the reaction medium to have a pH of about 6. This prevents the formation of the metal hydroxides and causes the precipitation of the mixed organometallic salts in high yields.

The preparation of these new metal salts by the means set forth is inexpensive and can be carried out in standard equipment. The reactions are easily performed, and the products are obtained in high yield and purity.

The physical properties of these metal salts are in general better than those of their organic components, for they are dry powders light in color, free from the oily characteristics of some of the constituent mercapto compounds and retain very little of the undesirable odor of the mercapto compounds.

The following are specific examples of the synthesis of some of the mixed organometallic salts.

*Example I*

190 grams of 37% formalin, equivalent to 2.34 gram-molecular equivalents of formaldehyde, are diluted with 200 ml. of water, and this solution is added, with stirring, to 550 grams of a cold 40% solution of ammonium dithiocarbamate, equivalent to 2 gram-molecular equivalents of ammonium dithiocarbamate. The heavy white precipitate which forms is dissolved by adding 160 grams of 50% sodium hydroxide solution to the reaction mixture. The resulting solution has a green color. This solution is mixed with 1200 ml. of an aqueous solution of 334 grams of 2-mercaptobenzothiazole and 160 grams of 50% sodium hydroxide solution, 2.0 gram-molecular equivalents of each, in a 5 liter flask. To this mixture is added, with stirring, 600 grams of 67% zinc chloride solution, 3.0 gram-molecular equivalents, made slightly acidic with hydrochloric acid. To facilitate stirring about 2 liters of water is added. The precipitate that forms is the mixed organometallic salt which is filtered off and dried. The actual yield of 679 grams is practically theoretical. This salt is a pale yellow powder which is believed to have the chemical formula:

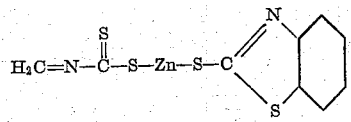

*Example II*

An alkaline solution containing substantially 075 gram-molecular equivalents each of sodium N-methylene dithiocarbamate and of the sodium salt of 2-mercapto-4,5-dimethylthiazole is prepared by the method described in Example I. To this solution is slowly added, with stirring, 565 grams of a 30% solution of zinc chloride to introduce substantially 1.25 molecular equivalent of zinc into the reaction mixture. A 2.5% by weight hydrochloric acid solution is then added to adjust the pH of the mixture to about 6. The white precipitate that forms is the mixed organometallic salt, whose yield, 235.6 grams, is substantially equivalent to the theoretical yield. The salt formed is believed to have the following formula:

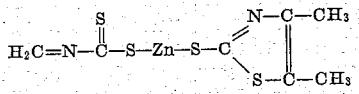

*Example III*

385 grams of a solution containing 15% zinc chloride by weight is added with stirring to a solution containing 0.75 gram-molecular equivalents each of sodium N-methylene dithiocarbamate and of the sodium salt of 2-mercaptothiazoline, as prepared by the method described in Example I, until substantially 0.9 of a molar equivalent of zinc chloride has been added. The pH of the mixture is adjusted to about 6 with dilute hydrochloric acid. The white precipitate that forms is the mixed organometallic salt which when filtered off and dried, weighs 195 grams. The mixed metal salt is believed to have the following formula:

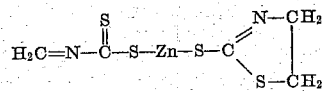

*Example IV*

A solution of sodium N-methylene dithiocarbamate and the sodium salt of 2-mercaptobenzothiazole is prepared as in Example I containing substantially one molecular equivalent of each. To this solution a quantity of a solution containing 20% manganous sulfate by weight is added slowly with vigorous stirring until 1.5 molecular equivalents of manganous sulfate are added. The pH of the mixture is adjusted to about 6 by the addition of concentrated hydrochloric acid solution. The pinkish precipitate that forms is the mixed manganous salt which when recovered by filtration and then dried yields a quantity of substantially pure material in approximately the theoretical yield to be expected from this reaction. The manganous salt is believed to have the following formula:

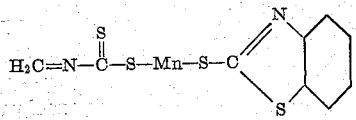

*Example V*

A solution of sodium N-methylene dithiocarbamate and the sodium salt of 2-mercaptobenzothiazole is prepared by the method described in Example I using 0.75 gram molecular equivalents of each component instead of 2 equivalents as used in Example I. To this solution is added, with stirring, a solution of 108 grams of ferric chloride (0.67 gram-molecular equivalents) dissolved in 500 ml. of water. The pH of the mixture is adjusted to about 6 by the addition of hydrochloric acid. The grey precipitate that forms is filtered off and after drying weighs 246 grams.

*Example VI*

Since some of the mercapto compounds are available as mixtures of two mercapto compounds, this example will demonstrate the use of one of these mixed mercapto materials. As in the other examples, a solution containing 0.75 gram-molecular equivalents of sodium N-methylene dithiocarbamate is prepared. To this solution is added a solution containing 0.75 molecular equivalents of the sodium salt of a mixture of a predominating proportion of 2-mercapto-4,5-dimethylthiazole and a minor proportion of 2-mercapto-4-ethylthiazole. To this mixture about a 1.25 molecular portion of manganous sulfate is added with stirring. The reaction mixture is made slightly acid, pH about 6, by the addition of hydrochloric acid. The light brown precipitate that forms is a mixture of two compounds whose structures are believed to be:

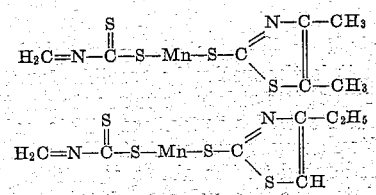

The yield is substantially equal to the theoretical yield. This mixture of organometallic salts does not have the oily or odoriferous nature of the original mercaptothiazole mixture.

*Example VII*

As in Example VI a solution containing equimolar portions of sodium N-methylene dithiocarbamate and a mixture of the sodium salts of 2-mercapto-4, 5-dimethylthiazole and 2-mercapto-4-ethylthiazole is first prepared. To this solution is slowly added with stirring, an acidified solution of zinc chloride containing one molecular equivalent of zinc for each molecular equivalent of N-methylene dithiocarbamate. When the addition is complete, the pH of the reaction mixture is adjusted to about 6. The buff-colored precipitate that forms is filtered off, washed, and dried. The yield is substantially equal to a molecular equivalent of the mixture of salts shown in the following formulae:

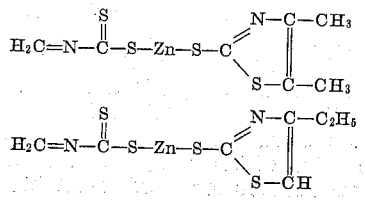

Example VIII

A solution containing 0.5 gram molecular equivalents each of sodium N-methylene dithiocarbamate and the sodium salt of 2-mercapto 4-methyl 6, 6-dimethyl thiazine is prepared. To this solution is added with stirring, 107 grams of a 67% zinc chloride solution to which 4 ml. of concentrated hydrochloric acid has been added. This contains a slight excess over 0.5 molecular equivalents of zinc chloride. The near white precipitate that forms is filtered, washed and dried. The dried mixed salt weighs 170 grams, a 100% yield and has the following possible formula:

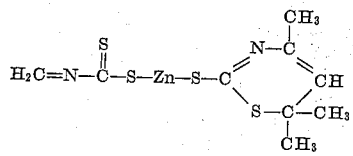

Example IX 0.25 molecular equivalents of sodium N-methylene dithiocarbamate is prepared. The sodium salt of diethyl dithiocarbamic acid is prepared by reacting 0.25 molecular equivalents of diethylamine and carbon disulfide in a sodium hydroxide solution in the usual manner. The two sodium salt solutions are combined. To this resulting solution is added slowly with stirring, 54 grams of a 67% zinc chloride solution diluted with 200 ml. of water to which 4 ml. of hydrochloric acid has been added. The light-colored precipitate that forms is filtered, washed and dried. The dried mixed salt weighs 76 grams, an 88% yield, and has the following possible formula:

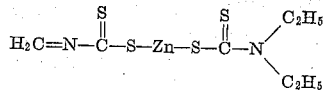

The mechanics of the formation of these mixed organometallic salts is not fully understood. The chemical structural formulae given in the examples are the ones probably existing for the compounds formed. The properties of the mixed salts described above are distinctly different from those of the salts of the same metals with either one of the two acidic components, indicating that the organometallic salts are new compositions of matter.

Although I have given specific examples of the formation of mixed organometallic salts, it is to be understood that the alkali-metal salt of any sulfhydryl compound may be used as the B component to produce similar mixed organometallic salts.

While I have herein disclosed specific embodiments of my invention, I do not thereby desire or intend to limit myself solely thereto, but intend to include all the obvious variations and modifications falling within the spirit and scope of the appended claims.

I claim:
1. The mixed organometallic salt produced by the reaction in an acidic aqueous medium of a water-soluble salt of a metal having a valence greater than one with an alkali metal salt of N-methylene dithiocarbamic acid and with an alkali metal salt of an organic sulfhydryl compound.

2. The mixed organometallic salt produced by the reaction in an acidic aqueous medium of a water-soluble salt of a metal having a valence greater than one with sodium N-methylene dithiocarbamate and the sodium salt of an organic thio-acid.

3. The mixed organometallic salt produced by the reaction in an acidic aqueous medium of a water-soluble salt of a metal having a valence greater than one with sodium N-methylene dithiocarbamate and the sodium salt of a mercaptan of nitrogen-containing heterocyclic compounds which have the nitrogen atom connected by a double bond to the carbon to which the mercapto group is joined.

4. The mixed organometallic salt produced by the reaction in an acidic aqueous medium of a water-soluble salt of a metal having a valence greater than one with sodium N-methylene dithiocarbamate and the sodium salt of a mercaptothiazole.

5. The mixed organometallic salt produced by the reaction in an acidic aqueous medium of a water-soluble salt of a metal having a valence greater than one with sodium N-methylene dithiocarbamate and the sodium salt of a mercaptothiazoline.

6. The mixed organometallic salt produced by the reaction in an acidic aqueous medium of a water-soluble salt of a metal having a valence greater than one with sodium N-methylene dithiocarbamate and the sodium salt of a dithiocarbamic acid.

7. The mixed organometallic salt produced by the reaction in an acidic aqueous medium of a water-soluble zinc salt with sodium N-methylene dithiocarbamate and the sodium salt of a mercaptothiazole.

8. The mixed organometallic salt produced by the reaction in an acidic aqueous medium of a water-soluble zinc salt with sodium N-methylene dithiocarbamate and the sodium salt of a mercaptothiazoline.

9. The mixed organometallic salt produced by the reaction in an acidic aqueous medium of a water-soluble zinc salt with sodium N-methylene dithiocarbamate and the sodium salt of a dithiocarbamic acid.

10. The mixed organometallic salt produced by the reaction in an acidic aqueous medium of substantially equimolecular portions of zinc chloride with sodium N-methylene dithiocarbamate and the sodium salt of 2-mercaptobenzothiazole.

11. The mixed organometallic salt produced by the reaction in an acidic aqueous medium of substantially equimolecular portions of zinc chloride with sodium N-methylene dithiocarbamate and the sodium salt of 2-mercaptothiazoline.

12. The method for the preparation of organometallic salts which comprises reacting in an acidic aqueous solution a water-soluble salt of a metal having a valence greater than one with an alkali metal salt of N-methylene dithiocarbamic acid and the alkali metal salt of an organic sulfhydryl compound.

13. The method for the preparation of organometallic salts which comprises reacting in an acidic aqueous solution a water-soluble salt of a metal having a valence greater than one with sodium N-methylene dithiocarbamate and the sodium salt of an organic thio-acid.

14. The method for the preparation of organo-metallic salts which comprises reacting in an acidic aqueous solution a water-soluble salt of a metal having a valence greater than one with sodium N-methylene dithiocarbamate and the sodium salt of a mercaptan of nitrogen-containing heterocyclic compounds which have the nitrogen atom connected by a double bond to the carbon to which the mercapto group is joined.

15. The method for the preparation of organo-metallic salts which comprises reacting in an acidic aqueous solution a water-soluble salt of a metal having a valence greater than one with sodium N-methylene dithiocarbamate and the sodium salt of a mercaptothiazole.

16. The method for the preparation of organo-metallic salts which comprises reacting in an acidic aqueous solution a water-soluble salt of a metal having a valence greater than one with sodium N-methylene dithiocarbamate and the sodium salt of a mercaptothiazoline.

17. The method for the preparation of organo-metallic salts which comprises reacting in an acidic aqueous solution a water-soluble salt of a metal having a valence greater than one with sodium N-methylene dithiocarbamate and the sodium salt of a dithiocarbamic acid.

ADOLPH J. BEBER.

Certificate of Correction

Patent No. 2,426,586.　　　　　　　　　　　　　　　September 2, 1947.

ADOLPH J. BEBER

It is hereby certified that error appears in the printed specification of the above numbered patent requiring correction as follows: Column 3, line 31, Example II, for "075" read $0.75$; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.*